US009944452B1

United States Patent
Mills et al.

(12) United States Patent
(10) Patent No.: US 9,944,452 B1
(45) Date of Patent: Apr. 17, 2018

(54) MULTI-LAYER INSULATION

(71) Applicant: Ball Aerospace & Technologies Corp., Boulder, CO (US)

(72) Inventors: Gary L. Mills, Boulder, CO (US); Bryce W. Unruh, Erie, CO (US); Reuben R. Rohrschneider, Longmont, CO (US)

(73) Assignee: BALL AEROSPACE & TECHNOLOGIES CORP., Boulder, CO (US)

( * ) Notice: Subject to any disclaimer, the term of this patent is extended or adjusted under 35 U.S.C. 154(b) by 48 days.

(21) Appl. No.: 14/968,294

(22) Filed: Dec. 14, 2015

Related U.S. Application Data

(60) Provisional application No. 62/091,353, filed on Dec. 12, 2014.

(51) Int. Cl.
*F16L 59/06* (2006.01)
*B65D 81/38* (2006.01)
*F16L 59/07* (2006.01)
*F16L 59/065* (2006.01)

(52) U.S. Cl.
CPC .......... *B65D 81/3813* (2013.01); *F16L 59/06* (2013.01); *F16L 59/065* (2013.01); *F16L 59/07* (2013.01); *F17C 2203/0375* (2013.01); *F17C 2203/0379* (2013.01); *F17C 2203/0682* (2013.01)

(58) Field of Classification Search
CPC ...... F17C 2203/0375; F17C 2203/0379; F17C 2203/0682; F16L 59/06; F16L 59/065; F16L 59/07

USPC ........................................... 428/69; 52/788.1
See application file for complete search history.

(56) References Cited

U.S. PATENT DOCUMENTS

| | | | |
|---|---|---|---|
| 3,152,033 A | 10/1964 | Black et al. | |
| 3,365,897 A | 1/1968 | Middleton et al. | |
| 3,616,139 A | 10/1971 | Jones | |
| 3,649,426 A | 3/1972 | Gates, Jr. | |
| 3,693,367 A * | 9/1972 | Di Peri | F17C 3/02 220/560.08 |

(Continued)

FOREIGN PATENT DOCUMENTS

| | | |
|---|---|---|
| FR | 2379751 | 9/1978 |
| GB | 2291672 | 1/1996 |

(Continued)

OTHER PUBLICATIONS

U.S. Appl. No. 14/698,469, filed Apr. 28, 2015, Mills et al.

(Continued)

*Primary Examiner* — Kevin Murphy
(74) *Attorney, Agent, or Firm* — Sheridan Ross P.C.

(57) ABSTRACT

A multilayer insulation is provided. The multilayer insulation includes a plurality of layers of material separated from one another by post elements. The interior of the integrated multilayer insulation can be filled with a selected gas. Moreover, the gas can be held in an interior volume of the integrated multilayer insulation at a pressure greater than ambient pressure, or flowed through the interior volume of the integrated multilayer insulation. The integrated multilayer insulation can be placed directly over an object to be insulated, or over a cellular insulation structure that is placed directly on the object to be insulated.

15 Claims, 11 Drawing Sheets

(56) References Cited

U.S. PATENT DOCUMENTS

| | | |
|---|---|---|
| 3,799,056 A | 3/1974 | Colignon |
| 3,884,646 A | 5/1975 | Kenney |
| 3,894,372 A | 7/1975 | Roberts et al. |
| 3,936,553 A | 2/1976 | Rowe |
| 3,941,964 A | 3/1976 | Yoder |
| 4,133,376 A | 1/1979 | Eilenberg et al. |
| 4,336,292 A | 6/1982 | Blair |
| 4,400,927 A | 8/1983 | Wolde-Tinase |
| 4,468,423 A | 8/1984 | Hall |
| 4,514,450 A | 4/1985 | Nowobilski et al. |
| 4,683,154 A | 7/1987 | Benson et al. |
| 4,707,393 A | 11/1987 | Vetter |
| 4,916,027 A | 4/1990 | DelMundo |
| 5,011,729 A | 4/1991 | McAllister |
| 5,030,518 A | 7/1991 | Keller |
| 5,038,693 A | 8/1991 | Kourtides et al. |
| 5,059,467 A | 10/1991 | Berkovitz |
| 5,100,725 A | 3/1992 | Pearson |
| 5,107,649 A | 4/1992 | Benson et al. |
| 5,157,893 A | 10/1992 | Benson et al. |
| 5,175,975 A | 1/1993 | Benson et al. |
| 5,199,484 A | 4/1993 | Schatz |
| 5,230,941 A | 7/1993 | Hollander et al. |
| 5,246,759 A | 9/1993 | Keller |
| 5,270,092 A | 12/1993 | Griffith et al. |
| 5,271,980 A | 12/1993 | Bell |
| 5,318,108 A | 6/1994 | Benson et al. |
| 5,343,796 A | 9/1994 | Cordova et al. |
| 5,349,893 A | 9/1994 | Dunn |
| 5,429,851 A | 7/1995 | Sallee |
| 5,433,056 A | 7/1995 | Benson et al. |
| 5,435,226 A | 7/1995 | McQuilkin |
| 5,445,857 A | 8/1995 | Nowobilski et al. |
| 5,451,448 A | 9/1995 | Sawko et al. |
| 5,480,706 A | 1/1996 | Li et al. |
| 5,489,321 A | 2/1996 | Tracy et al. |
| 5,496,640 A | 3/1996 | Bolton et al. |
| 5,502,292 A | 3/1996 | Pernicka et al. |
| 5,562,154 A | 10/1996 | Benson et al. |
| 5,580,620 A | 12/1996 | Campbell et al. |
| 5,792,539 A | 8/1998 | Hunter |
| 5,966,888 A | 10/1999 | Richardson |
| 6,280,814 B1 | 8/2001 | Offermann et al. |
| 6,423,918 B1 | 7/2002 | King et al. |
| 6,427,945 B1 | 8/2002 | Bansemir |
| 6,481,670 B1 | 11/2002 | Bigelow et al. |
| 6,485,805 B1 | 11/2002 | Smith et al. |
| 6,547,189 B1 | 4/2003 | Raboin et al. |
| 6,712,318 B2 | 3/2004 | Gubert et al. |
| 6,739,104 B2 | 5/2004 | Tokonabe et al. |
| 6,860,082 B1 | 3/2005 | Yamamoto et al. |
| 7,001,656 B2 | 2/2006 | Maignan et al. |
| 7,111,752 B2 | 9/2006 | Bucher et al. |
| 7,169,459 B2 | 1/2007 | Lichodziejewski et al. |
| 7,288,326 B2 | 10/2007 | Elzey et al. |
| 7,296,769 B2 | 11/2007 | Hogenson et al. |
| 7,763,272 B2 | 7/2010 | Offermann et al. |
| 7,954,301 B2 | 6/2011 | Mills |
| 8,122,646 B1 | 2/2012 | Johnson |
| 8,167,247 B2 | 5/2012 | Daily et al. |
| 8,211,516 B2 | 7/2012 | Bowers et al. |
| 8,234,835 B2 | 8/2012 | Dye et al. |
| 8,266,866 B1 | 9/2012 | Johnson |
| 2007/0089989 A1 | 4/2007 | Hoagland et al. |
| 2011/0281082 A1 | 11/2011 | Wilson |
| 2012/0175467 A1 | 7/2012 | Dye et al. |
| 2012/0305717 A1 | 12/2012 | Dye et al. |
| 2013/0029082 A1 | 1/2013 | Park |
| 2013/0105496 A1 | 5/2013 | Jung et al. |

FOREIGN PATENT DOCUMENTS

| | | | |
|---|---|---|---|
| WO | WO 2009147162 A1 * | 12/2009 | ............... F17C 3/04 |
| WO | WO 2012/084874 | 6/2012 | |
| WO | WO 2015/147389 | 10/2015 | |

OTHER PUBLICATIONS

Murrill, "Solar System's Best-Outfitted Spacecraft Dons Its Thermal Cloak," California Institute of Technology Press Release, NASA, 1997, available at www.jpl.nasa.gov/releases/97/csblank.html, 2 pages.

Doody, "Typical Onboard Systems," Basics of Space Flight, Chapter 11, 2001, California Institute of Technology, NASA, available at www2.jpl.nas.gov/basics/bsf11-4.html, 7 pages.

Stultz et al., "Test-Derived Effective Emittance for Cassini M1.] Blankets and Heat Loss Characteristics in the Vicinity of Seams," 1995, California Institute of Technology, 11 pages, Abstract.

Buchanan et al., "High Performance MLI for Cryogenic Hardware," Ball Aerospace & Technologies Corp., 2003, 20 pages.

Wikipedia, "Multi-layer Insulation," last modified Feb. 1, 2008, available at http://en.wikipedia.org/wiki/Multi-layer_insulation, 2 pages.

Getty et al., "Experimental Evaluation of Some Selected Lightweight Superinsulation for Space Vehicles," Advances in Cryogenic Engineering, 1966, vol. 11, pp. 35-48.

Donabedian, et al. "Chapter 5: Insulation", Satellite Thermal Control Handbook (David G. Gilmore, ed.), The Aerospace Corporation, 2002, 24 pages.

Mohling, et al., "Multilayer Insulation Thick Blanket Performance Demonstration, Final report for the Period Sep. 23, 1986 to May 13, 1987", Ball Aerospace Systems Division, Prepared for Air Force Astronautics Laboratory, 248 pages (1987).

Mohyling, et al. "Multilayer Insulation Thick Blanket Performance Demonstration, Final report for the Period May 1987 to Dec. 1989", Ball Aerospace Systems Division, Prepared for Air Force Astronautics Laboratory, 1990, 131 pages.

Keller, et al. "Final Report: Thermal Performance of Multilayer Insulations," Lockheed Missiles & Space Co., Prepared for the National Aeronautics and Space Administration, 1974, 446 pages.

Official Action for U.S. Appl. No. 14/698,469, dated Jan. 13, 2017 8 pages Restriction Requirement.

Official Action for U.S. Appl. No. 14/698,469, dated May 2, 2017 15 pages.

* cited by examiner

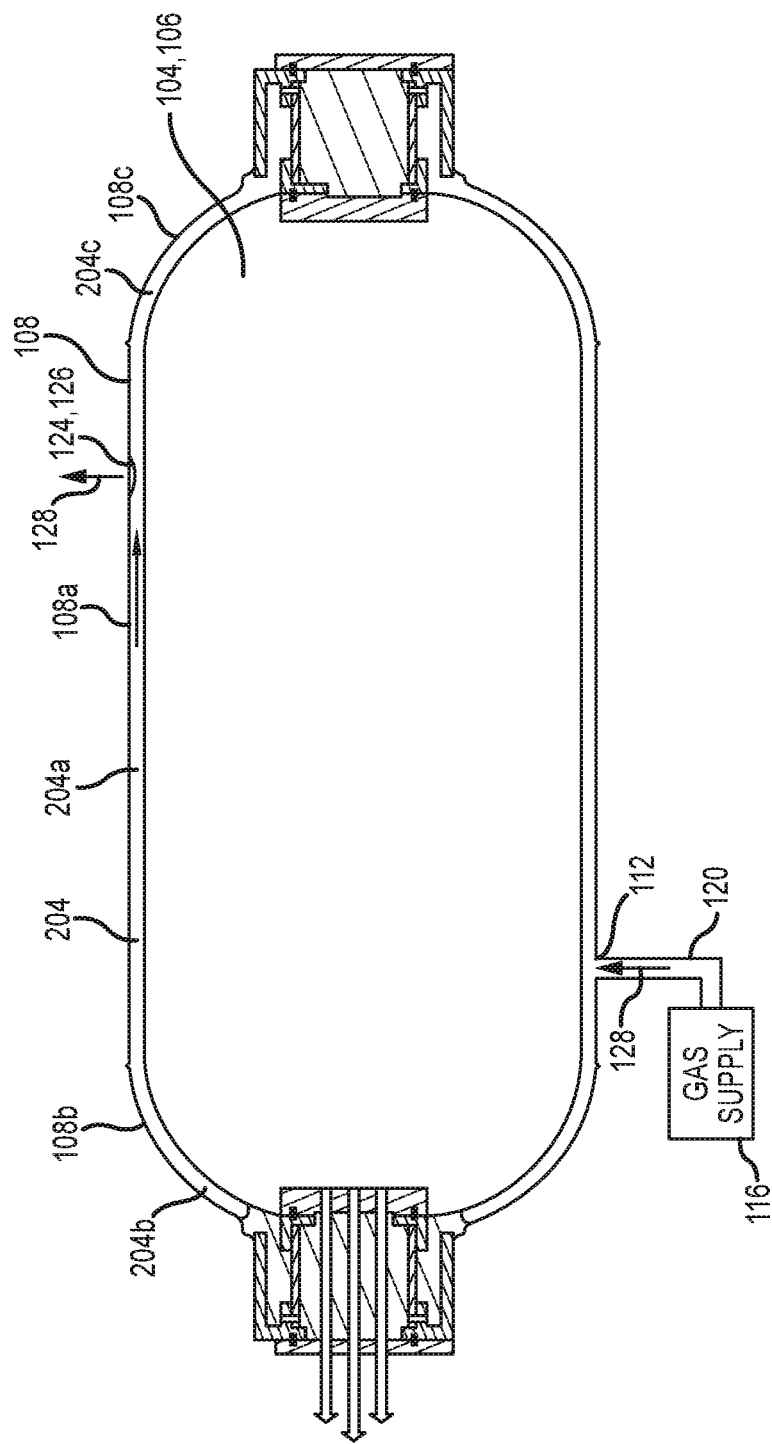

MULTI-LAYER INSULATION

CROSS REFERENCE TO RELATED APPLICATIONS

This application claims the benefit of U.S. Provisional Patent Application Ser. No. 62/091,353, filed Dec. 12, 2014, the entire disclosure of which is hereby incorporated herein by reference.

FIELD

The present invention relates generally to thermal multi-layer insulation (MLI).

BACKGROUND

Multilayer insulation (MLI) is used in applications requiring lightweight, high performance thermal insulation such as spacecraft, cryogenic tanks (dewars), cryogenic refrigerators, and instruments. MLI is typically used in a high vacuum ($<10^{-2}$ Pascal) where its performance exceeds alternative insulations by a factor of ten. However, the heat flow through the MLI is usually the major heat leak in cryogenic systems, so improvements in thermal performance would be desirable.

In cryogenic space propulsion applications, an insulation system that has high performance on orbit is required. However, the insulation must also provide adequate performance during pre-launch and launch to prevent frost. Also, the insulation is required to have a low mass, so that the payload capacity of the vehicle used to place the system in orbit is not unduly affected. As another requirement, the insulation should be able to withstand various stresses that may be placed on it during vehicle launch.

Multilayer insulation typically consists of layers of metalized polymer sheets that are separated by fabric web or net, commonly made of silk or polyester. The fabric net is often attached to the polymer sheets only at the edges. The thermal and mechanical contact between the net and sheets is not well controlled and therefore the conductance through the layers is difficult to predictably characterize. The net is a soft fiber material that has a high thermal contact conductance. Use of the insulation within the atmosphere requires a vacuum shell that does not put a compressive load on the insulation. Such a vacuum shell is inherently heavy (on the order of 10 kg/m^2) and difficult to make more lightweight because the shell has to resist buckling, which is governed by the material modulus of elasticity.

Still other MLI structures have been developed that utilize polymer or other spacer elements between layers. These spacer elements can be configured to create thermal disconnects when the insulation is in a vacuum or low pressure environment, improving the thermal performance as compared when the insulation is at normal atmospheric pressure. Although such structures provide excellent insulation properties, particularly when in a low pressure environment, it would be desirable to improve the performance of such structures in normal atmospheric pressure environments.

Other MLI technologies consist of honeycomb insert material sandwiched between inner and outer layers. Such structures are light in weight and can be made very rigid relative to their weight. However, the insulation performance of such structures has been less than desired.

Still other technologies for insulating spacecraft, cryogenic tanks, or other structures include spray on foams (SOFs). SOF insulation can be used alone or in combination with MLI structures. However, the insulation performance and structural integrity of spray on foams is less than desired.

SUMMARY

Embodiments of the present disclosure provide a high performance integrated thermal insulation (IMLI) structure that includes a plurality of thermal radiation shields, also referred to herein as sheets, that are separated from one another by structural members. The sheets may comprise layers of polymer material, including but not limited to polymer materials laminated to or coated with a metal. The structures separating the sheets can include pluralities or sets of support posts. As an example, the support posts may be formed from a polymer material. In accordance with at least some embodiments of the present disclosure, the interior of the IMLI structure forms a chamber that is filled with a selected gas. The pressure of the selected gas within the chamber in such embodiments is slightly above the ambient atmospheric pressure. In accordance with further embodiments of the present disclosure, more than one sealed chamber within the IMLI structure is defined. Moreover, different chambers within the structure may contain different selected gasses.

In accordance with still other embodiments of the present disclosure, an IMLI structure is combined with a secondary insulating structure. The secondary insulating structure may comprise a cellular insulation structure that includes top and bottom layers spaced apart from one another by a multi cell or cellular insulating element. The cellular insulation structure can, for example, comprise a honeycomb type material. Each of the cells within the cellular insulation structure can contain a getter material and a selected gas. The cellular insulation structure can be placed on or adjacent to a structure to be insulated, while an IMLI structure can be placed on or over the opposite surface of the cellular insulation. Accordingly, embodiments of the present disclosure provide a composite insulating structure or system that combines a cellular insulation structure with an IMLI structure.

Methods in accordance with embodiments of the present disclosure also include placing an IMLI structure over a structure to be insulated. The IMLI structure can be placed directly on or over the assembly to be insulated, or the IMLI can be placed over a cellular insulation structure, if provided. Chambers or interior volumes defined within the IMLI can be filled with a selected gas. Moreover, where multiple chambers are defined within the IMLI, different chambers can be filled with different gasses. The gas may be held within a respective chamber at a pressure that is at or slightly above atmospheric pressure. The interior of a chamber within the IMLI can be in communication with a gas source. Moreover, gas from the gas source can be held at a constant, static pressure, or the gas can be flowed through the respective chamber, for example from an inlet port to an outlet port or valve, where the outlet valve produces a back pressure sufficient to maintain the pressure of the selected gas within the chamber at a pressure above ambient pressure. Where a chamber or chambers within the IMLI are connected to a gas source, that connection can be broken upon launch (i.e., at T0) or other movement of a vehicle carrying the insulated assembly and the accompanying insulation. Upon disconnection, gas can be vented through a one way valve as the vehicle gains in altitude and the surrounding pressure reduces. Alternatively, the port to which the gas source was connected can simply be an open aperture.

Additional features and advantages of embodiments of the present disclosure will become more readily apparent from the following discussion, particularly when taken together with accompanying drawings.

BRIEF DESCRIPTION OF THE DRAWINGS

FIG. 2A is a cross-section of an integrated multi-layer insulation structure in accordance with embodiments of the present disclosure installed over a vessel and connected to a gas source;

DETAILED DESCRIPTION

Figure 1:
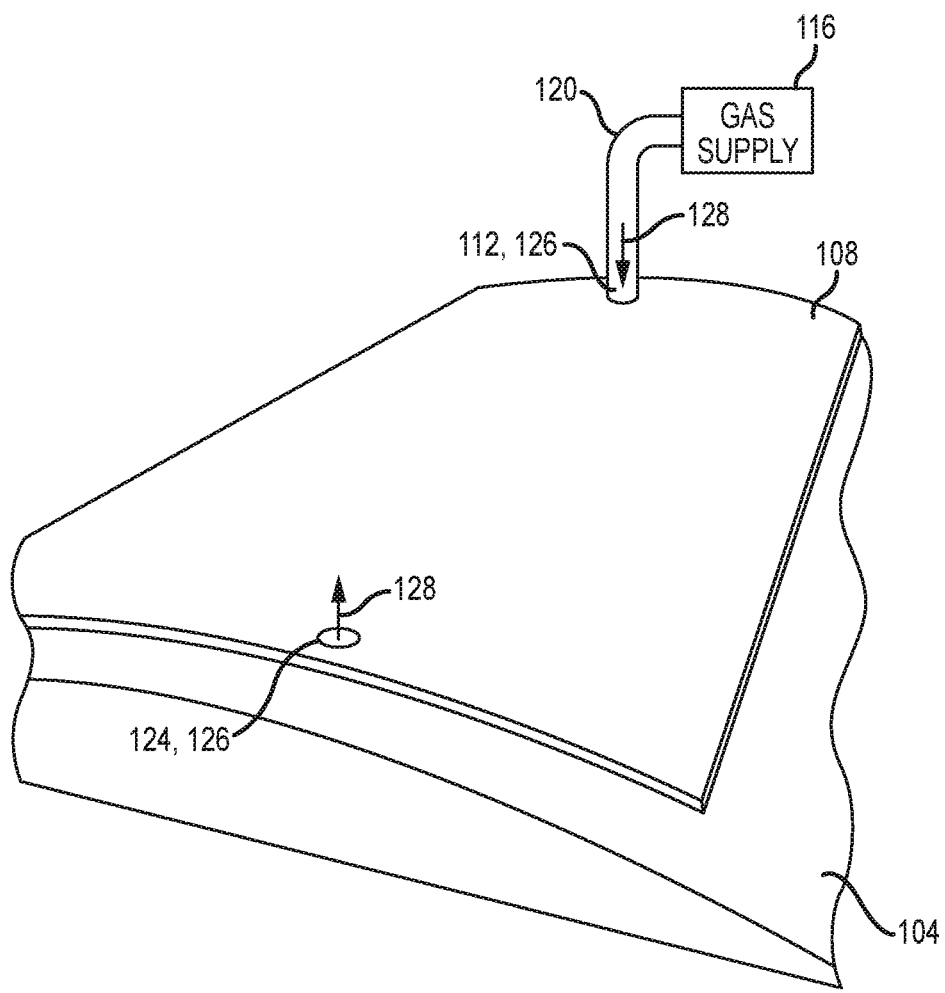
FIG. 1 is a perspective view of an integrated multilayer insulation structure in accordance with embodiments of the present disclosure, installed over a vessel.

FIG. 1 is a perspective view of an assembly, storage vessel, tank or other object 104 with an integrated multilayer insulation (IMLI) structure 108 in accordance with embodiments of the present disclosure installed over at least a portion of the object 104. More particularly, an IMLI structure 108 panel, which can be combined with other panels to more fully or even completely cover the object 104 being insulated, is shown. In this example, the IMLI structure 108 is placed directly on a surface of the object 104. In accordance with other embodiments, at least portions of the IMLI structure 108 can be spaced apart from the surface of the object 104.

In accordance with at least some embodiments of the present disclosure, an interior volume of the IMLI structure 108 can be filled with a gas 128. The gas 128 can be provided to purge moisture and other undesired materials from the interior volume. Moreover, the gas 128 can be introduced to the interior of the IMLI structure 108 through an inlet port 112 connected to a gas supply or storage vessel 116 via a conduit 120. The gas supply 116 can maintain the gas 128 within the IMLI structure 108 at a pressure that is above the ambient atmospheric pressure. In accordance with at least some embodiments, the gas 128 can flow through the IMLI structure 108, from the inlet port 112 to an outlet port 124. The outlet port 124 may comprise or be associated with a valve 126, such as a mechanical or electronically operated valve 126, that provides a back pressure to maintain the gas 128 within the IMLI structure 108 at a pressure above the ambient atmospheric pressure. In accordance with still other embodiments, the outlet port 124 may comprise an aperture that is sized to maintain the pressure of the gas 128 within the IMLI structure 108 at a level higher than the ambient atmospheric pressure. In accordance with still other embodiments, a separate outlet port 124 need not be provided.

In at least some embodiments, the gas supply 116 can be disconnected from the inlet port 112 when, for example, the object 104 being insulated is launched, or maintenance of the connection to the gas supply 116 is otherwise no longer desired. The inlet port 112 can then cease functioning as an inlet port 112, and instead begin functioning as an outlet port 124. Moreover, the inlet port 112 can be associated with a mechanically or electronically controlled valve 126, to selectively allow gas 128 to at least one of enter into or escape from the interior volume of the IMLI structure 108. In accordance with still other embodiments, the inlet port 112 may simply comprise an open aperture after the supply conduit 120 has been disconnected from the inlet port 112, allowing gas 128 within the IMLI structure 108 to escape. As depicted in the figure, the supplied gas 128 can be introduced through one or more inlet ports 112 at one end of the IMLI structure 108 and can exit the IMLI structure 108 through one or more outlet ports 124 at an opposite end of the IMLI structure 108, such that the gas 128 is flowed through the IMLI structure 108, from one end of that structure to the other, thereby providing a purge function. In particular, moisture or other undesired substances can be purged from the interior of the IMLI structure 108 by flowing the gas 128 through the IMLI structure 108. Alternatively, for example where an outlet port 124 is not provided, a static supply of pressurized gas 128 can be used to prevent moisture or other unwanted substances from entering the interior volume of the IMLI structure 108.

In FIG. 2A, an example IMLI structure 108 in accordance with embodiments of the present disclosure, installed over an object 104 comprising a pressure vessel 106, is shown in cross section. In such an embodiment, the IMLI structure 108 may be provided as a central panel that is wrapped around the center portion of the pressure vessel 106 to form an annular central structure 108a, and to create an annular interior volume 204a between the exterior of the object 104 and the central structure 108a. In addition, first 108b and second 108c end pieces can be provided at opposite ends of the object 104 and connected to the central structure 108a, to substantially enclose the object 104 and complete the IMLI structure 108. The interior volume 204a portion of the central structure 108a can be in communication with the interior volume portions 204b and 204c of the end pieces 108b and 108c, to form a contiguous interior volume 204. Alternatively, the interior volume portions 204a-c of the different sections 108a-108c can be separated or compartmentalized. The gas 128 introduced to the interior volume 204 of the IMLI structure 108 from the gas supply 116 can circulate throughout the interior volume 204. Moreover, where an outlet port 124 is provided, gas 128 can escape from the interior volume 204 through the outlet port 124.

Figure 2B:
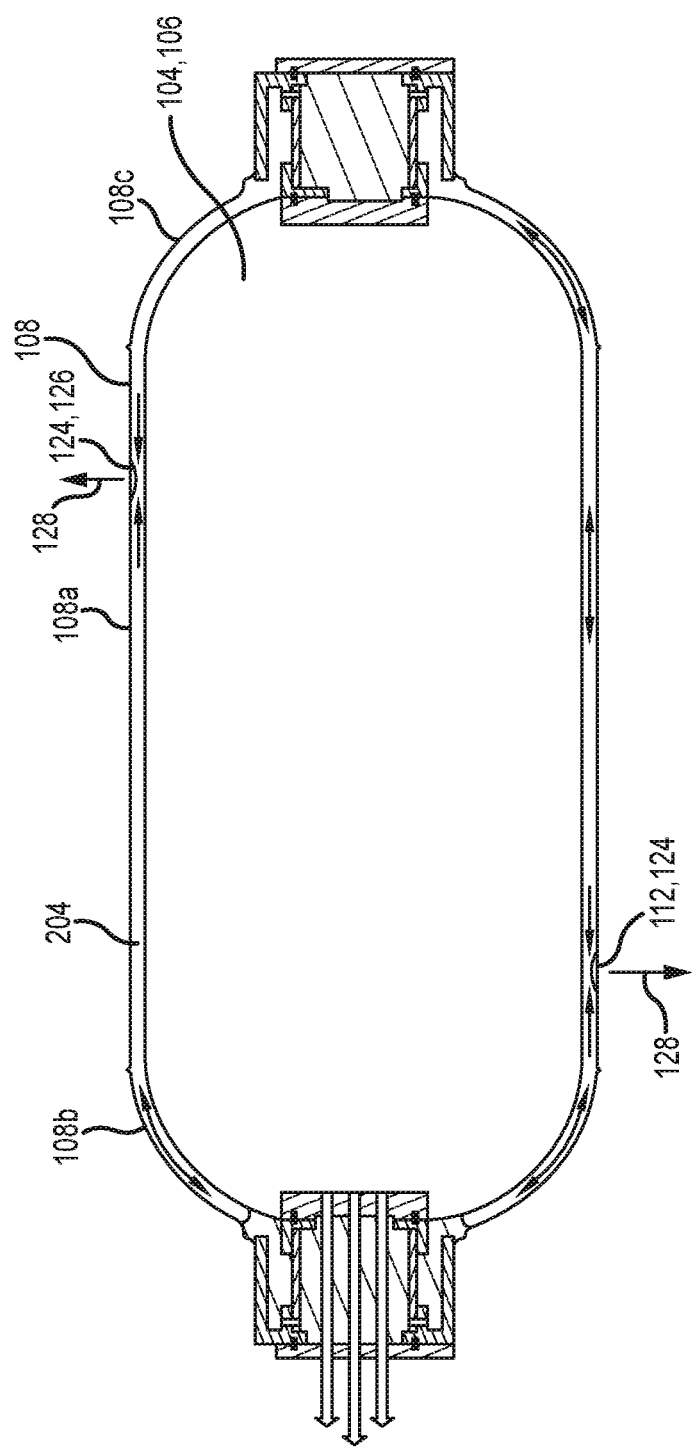
FIG. 2B illustrates the integrated multilayer insulation structure of FIG. 2A, disconnected from the gas source.

As shown in FIG. 2B, the IMLI structure 108 can be disconnected from the gas supply 116, for example when a vehicle carrying the object 104 being insulated is launched or otherwise moved, or after disconnection from the gas supply 116 is otherwise desired. As depicted in the figure, the inlet port 112 can be configured such that gas 128 is allowed to escape through that port 112 after the conduit 120 is disconnected from the port 112. More particularly, FIG. 2B illustrates the gas source 116 immediately after being disconnected from the inlet port 112 (e.g., at a time T0+i). As shown, gas 128 can be allowed to exit the interior volume 204 through the ports 112 and 124. The rate of flow of the gas 128 can be regulated, for example through sizing of the ports 112 and 124, or through the inclusion of valves 126, such as but not limited to one-way valves. Accordingly, one or both of the inlet port 112 and the outlet port 124 can incorporate a valve 126 that allows gas 128 to escape through the inlet port 112. Moreover, such a valve 126 can be mechanically or electronically controlled. In accordance with still other embodiments, one or both of the inlet port 112 and the outlet port 124 can simply be an aperture that remains open after the supply conduit 120 has been disconnected.

Figure 3A:
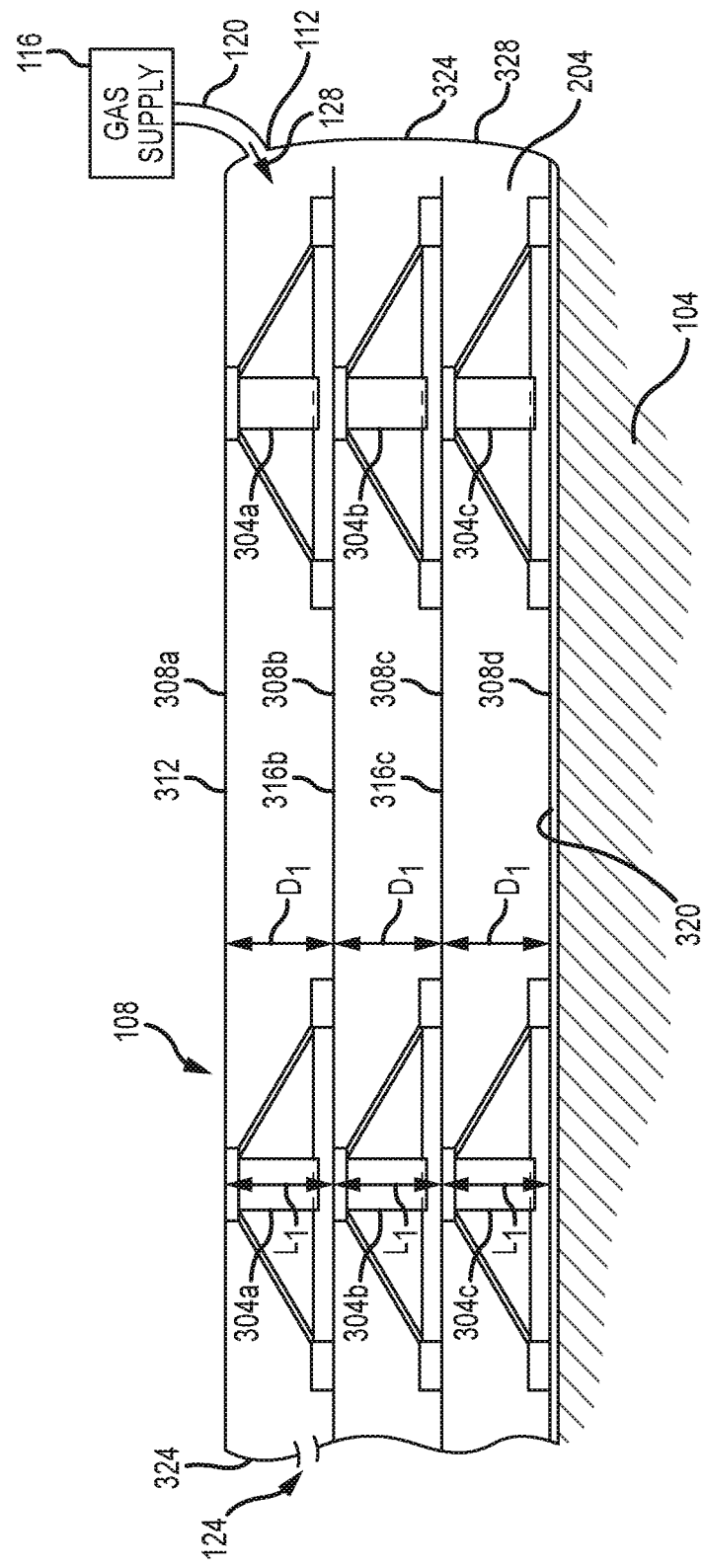
FIG. 3A is a partial cross-section of an integrated multi-layer insulation structure in accordance with embodiments of the present disclosure.

FIG. 3A is a partial cross-section of the IMLI structure 108, and in particular a load responsive or LRMLI structure, in a no-load condition. As can be appreciated by one of skill in the art after consideration of the present disclosure, the no-load condition is present when the pressure in the interior volume 204 of the IMLI structure 108 is at or close to the pressure of the surrounding environment. The IMLI structure 108 generally includes a plurality of spacers or post elements 304. The post elements 304 generally maintain a spacing $D_1$ between adjacent sheets or layers of material 308 when the IMLI structure 108 is in a no-load or near no-load condition. In this example, the post elements 304 are load responsive elements, in that they present a first length $L_1$ between a top and a bottom of the post elements 304 when they are in an unloaded or lightly loaded condition. In accordance with at least some embodiments of the present disclosure, the post elements 304 are arranged in a lattice configuration between adjacent layers 308. Moreover, post elements 304a included in a first set of spacers disposed between first 308a and second 308b layers of material are generally aligned with post elements 304b included in a second set of spacers, and so on. In accordance with still other embodiments, the post elements 304 can be static, rather than load responsive, such that they maintain a constant separation between adjacent layers of material 308.

The IMLI structure 108 includes a sheet of material 308a forming an outer layer 312. The outer layer 312 can comprise a membrane forming a boundary of an interior volume 204. The material or composition of the outer layer 312 can be selected to provide low permeability. The outer layer 312 can also be selected to provide desired amounts of flexibility and elasticity, to accommodate expansion and contraction of the object 104 being insulated. In accordance with at least some embodiments of the present disclosure, the outer layer 312 can comprise a laminated or composite material. For example, the outer layer 312 can be formed from a laminate of a polymer and a metal, a metal matrix composite (MMC), such as carbon fiber in aluminum, or a laminate of a number of layers of one or more materials.

The IMLI structure 108 also includes one or more sheets of material 308 that are disposed in an interior of the volume 204 as inner sheets or layers 316. In general, the inner layers 316 are between the object being insulated 104 and the outer layer 312. The inner layers 316 may comprise a film, such as Mylar, or a laminate, such as Kapton. The inner layers 316 can be formed from the same material as the outer layer 312, or can be formed from a different material. In the example structure 108 illustrated in FIG. 3A, four layers 308a-d are provided with two of the layers 308b and 308c comprising inner layers 316a and 316b. However, any number of inner layers 316 can be provided.

A base layer 320 can also be provided as part of the IMLI structure 108. The base layer 320 can be the same as the inner layers 316, except that it is the layer closest to the object 104 being insulated, and has only one surface that is in contact with post elements 304. Therefore, the base layer 320 can be composed of the same material as is used for an interior layer 316. In accordance with still other embodiments, the base layer 320 can be specially configured. For instance, the base layer 320 can be configured such that the surface that is adjacent to or in contact with the object 104 being insulated is abrasion resistant, tear resistant, or capable of forming a hermetic seal. As an example, the base layer 320 can comprise a metal. For instance, the base layer 320 can be formed from a sheet of stainless steel, as sheet of aluminum, a sheet of titanium, a sheet of some other metal or metal alloy, a laminate of a polymer and a metal, a metal matrix composite (MMC), such as carbon fiber in aluminum, or a laminate of a number of layers of one or more materials.

The sides of the IMLI structure 108 can be sealed by one or more side members 324. The side members 324 can be adhered or welded to the outer 312 and base 320 layers, to seal the interior volume 204. Optionally, some or all of the side members 324 can be adhered or welded to the interior layers 316. In addition, the side member 324 can be contoured, to facilitate changes in a distance between the outer layer 312 and the base layer 320. For instance, the side member 136 can include one or more corrugations. At least one of the side members can be a manifold structure 328. The manifold structure 328 can be adhered or welded to the outer 312 and the base 320 layers, but spaced apart from the interior layers 308 to provide a communication path for gas 128 between different adjacent pairs of layers 308. In accordance with still other embodiments, edges of the outer 312 and base 320 layers can be connected to one another, for example through bonding or an adhesive, in order to seal some or all of the sides of the interior volume 204. An outlet 124 can also be provided, for example in the outer layer 312, in a side member 324, or both.

Figure 3B:
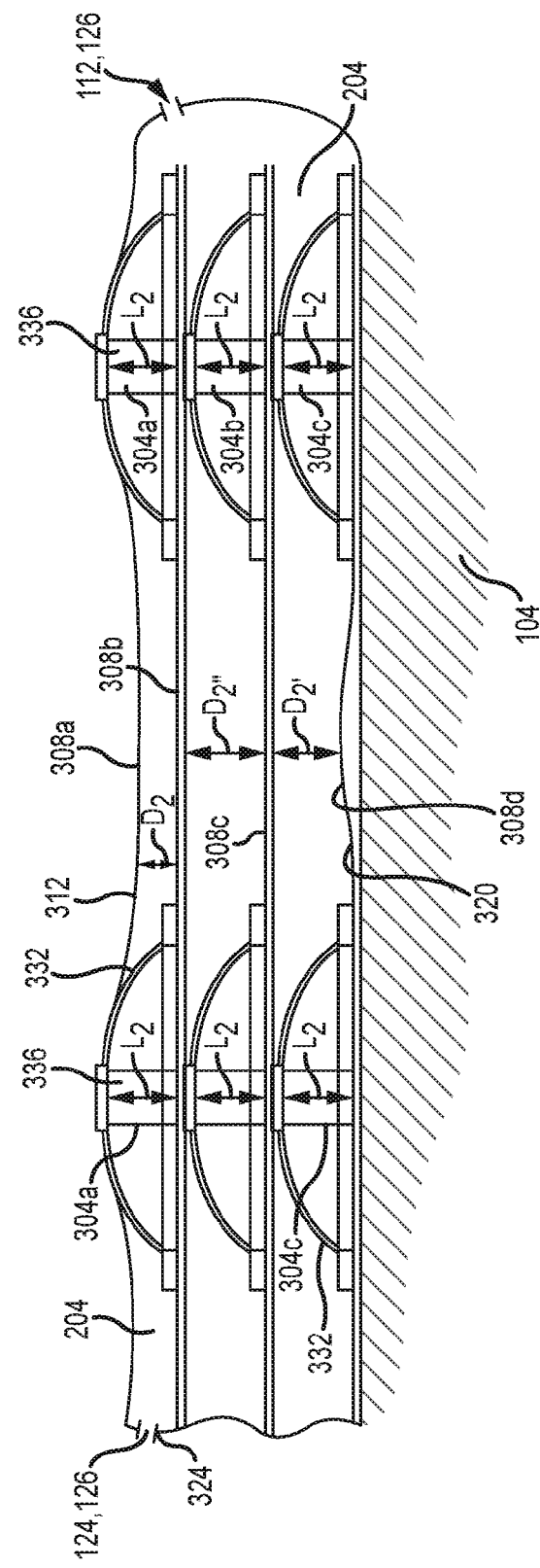
FIG. 3B illustrates the integrated multi-layer insulation structure of FIG. 3A in a loaded state.

As shown in FIG. 3B, when the IMLI structure 108 is in a loaded condition, for example when a vacuum or a partial vacuum is formed in the interior volume 204 such that the pressure inside the interior volume 204 is less than that of the surrounding environment, the post elements 304 are compressed. In this condition, the spacing between adjacent layers is reduced. In particular, the spacing between the layers 308 is reduced. This reduction is due at least in part to the flexibility, the elasticity, or both of the outer layer 312, and in this example to the transition of the load responsive post elements 304 between the layers 308 to a loaded state. In particular, the post elements 308 present a second length $L_2$ between the top and bottom surfaces of the posts 308 due to, in this example, the compression of flexible post legs 332 and the engagement of a rigid support member 336 of the posts 304. FIG. 3B also depicts the IMLI structure 108 after the gas source 116 has been disconnected, and with valves 126 associated with the ports 112 and 124 closed.

In general, it is desirable to avoid contact between the adjacent layers 116, because such contact creates a thermal short in the insulation structure. Accordingly, the height of the post elements 112 is selected, based on various parameters, to prevent any portion of the outer layer 312 from touching an underlying layer of material 316. These parameters can include the spacing between posts 304, the elasticity of the outer layer 312, the pressure differential between the interior and exterior surfaces of the membrane comprising the outer layer 312, thermal expansion and contraction, or any other parameter.

Figure 4:
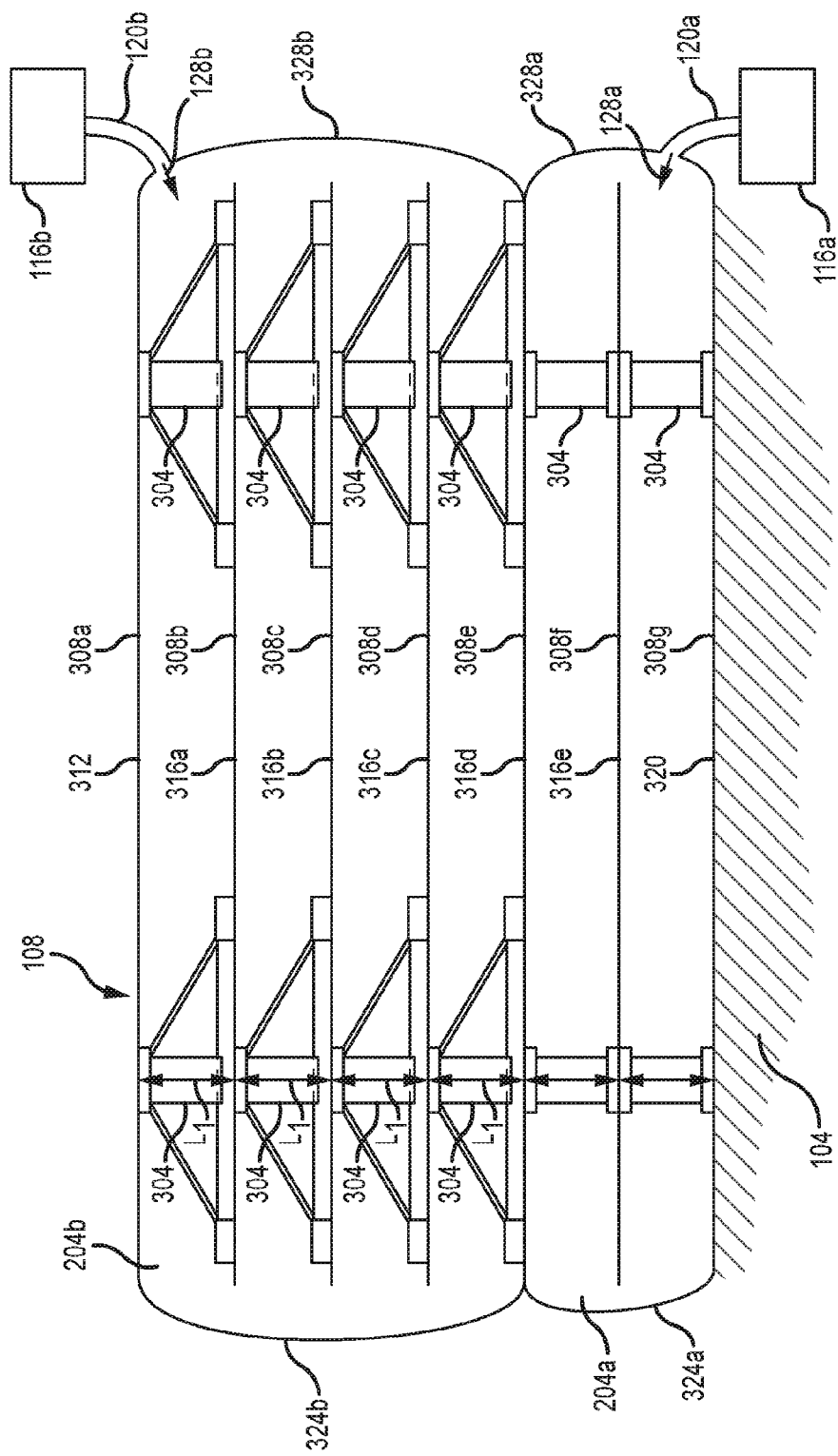
FIG. 4 is a partial cross-section of an integrated multi-layer insulation structure in accordance with other embodiments of the present disclosure.

With reference now to FIG. 4, an integrated multilayer insulation 108 in accordance with further embodiments of the present disclosure is illustrated. The embodiment illustrated in FIG. 4 is similar to the embodiment illustrated in FIG. 3, in that the IMLI 108 includes a plurality of sheets of material 308 that are separated from one another by sets of post elements 304 interposed between adjacent sheets of material 308. However, the IMLI structure 108 in this example embodiment is configured so that multiple interior volumes 204 are formed. In particular, the IMLI structure 108 includes a plurality of side members 324a-b and a plurality of manifold structures 328a-b that are configured to define a first interior volume 204a proximate to the surface of the object 104 being insulated and a second interior volume 204b that lies on a side of the first interior volume 204a opposite the side adjacent the object 104 being insulated. The interior layer 316d between the first 204a and second 204b volumes may form at least part of a hermetic barrier between the two volumes 204a and 204b. In addition, the first interior volume 204a contains static post elements 304, while the second interior volume contains load responsive post elements 304. In general, the static post elements 304 have a fixed length, as compared to the load-variable length of the load responsive post elements 304.

The first interior volume 204a and the second interior volume 204b can be connected to first and second gas supplies 116a and 116b respectively. In accordance with at least some embodiments of the present disclosure, the first gas supply 116a is a reservoir that provides a first gas 128a to the first interior volume 204a, while the second gas supply 116b is a reservoir that provides a second gas 128b to the second interior volume 204b. The first gas 128a can be selected based on the characteristics of the gas. For example, where the object 104 being insulated is a cryogenic storage tank for hydrogen, helium can be selected as the first gas 128a supplied by the first gas supply 116a, while nitrogen can be selected as the second gas 128b supplied by the second gas supply 116b. In this example, nitrogen is selected for use in the second interior volume 204b because of its relatively low thermal conductivity. However, nitrogen would freeze against or proximate to the surface of the object 104 comprising the storage tank. Therefore, helium is selected for use in the first interior volume 204a, because, although it has a higher thermal conductivity than nitrogen, helium would remain in a gaseous state. Additional or other gasses that can be selected for use in one or more interior volumes 204 of an IMLI structure 108 in accordance with embodiments of the present disclosure include, in addition to nitrogen and helium, air, dry air, carbon dioxide, and any other gas with a low freezing temperature, low thermal conductivity, or both.

One or more of the gas supplies 116 can be configured to disconnect from the associated interior volume 204 when a vehicle carrying the object 104 being insulated is launched or is otherwise moved, or when a disconnection is otherwise desired. That is, a gas supply can be configured with a T0 disconnect. Alternatively, one or more of the gas supplies 116 can remain with the object 104 being insulated as that object 104 is moved. Moreover, one or all of the interior volumes 204 can be associated with a vent or outlet port 124. For example, where an interior volume 204 is associated with a gas supply 116 that remains connected to the associated interior volume 204, an outlet port 124 can be associated with a valve or can be sized such that a desired back pressure is maintained within the associated interior volume 204. Moreover, when a gas supply 116 remains connected to the interior volume 204, a continuous flow of the gas 128 provided by the gas supply 116 can be maintained, at least until the supply of gas 128 within the gas supply 116 is exhausted. Where an interior volume 204 is associated with a gas supply 116 that is disconnected when the object 104 being insulated is moved, gas 128 can vent from the associated interior volume 204 through the inlet port 112 to which the gas supply 116 was connected, and also through an outlet port 124, if provided.

Figure 5:
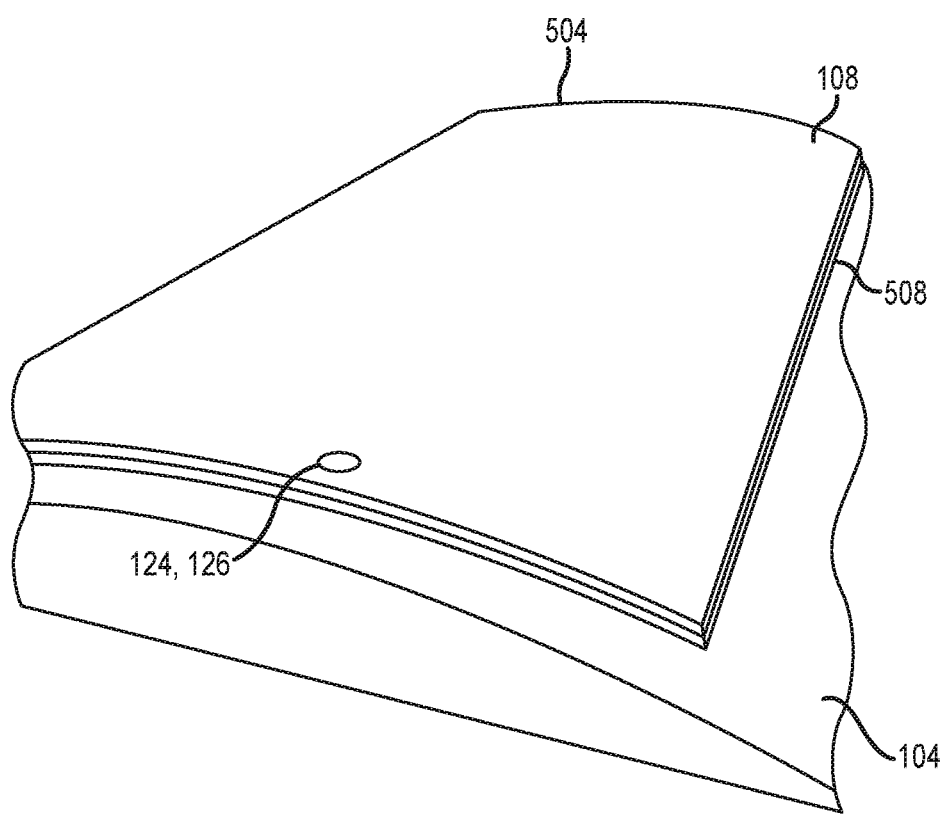
FIG. 5 is a perspective view of an integrated multilayer insulation structure in accordance with other embodiments of the present disclosure, installed over a vessel.

With reference now to FIG. 5, a composite IMLI structure 504 in accordance with embodiments of the present disclosure is illustrated. The composite IMLI structure 504 includes an IMLI structure 108 in combination with a cellular insulation structure 508. More particularly, the cellular insulation structure 508 is placed on or adjacent to the object 104 being insulated, and the IMLI structure 108 is placed on a side of the cellular insulation structure 508 opposite the side of the cellular insulation structure 508 placed on or adjacent to the object 104. The example composite IMLI structure 504 in FIG. 5 does not include any external gas source. In such an embodiment, the interior volume 204 of the IMLI structure 108 can be filled with a gas during manufacture, can be evacuated, or can be connected to an ambient environment through a port, such as an outlet port 124. Moreover, if provided, the outlet port 124 can include a valve 126 that maintains a selected pressure within the interior volume 204, or that opens when the object 104 being insulated and the composite IMLI structure 504 have reached a particular environment. In other embodiments of the present disclosure, the IMLI structure 108 can be connected to a gas source 116 and gas 128 can be flowed through or held at an elevated pressure in the interior volume 204.

Figure 6:
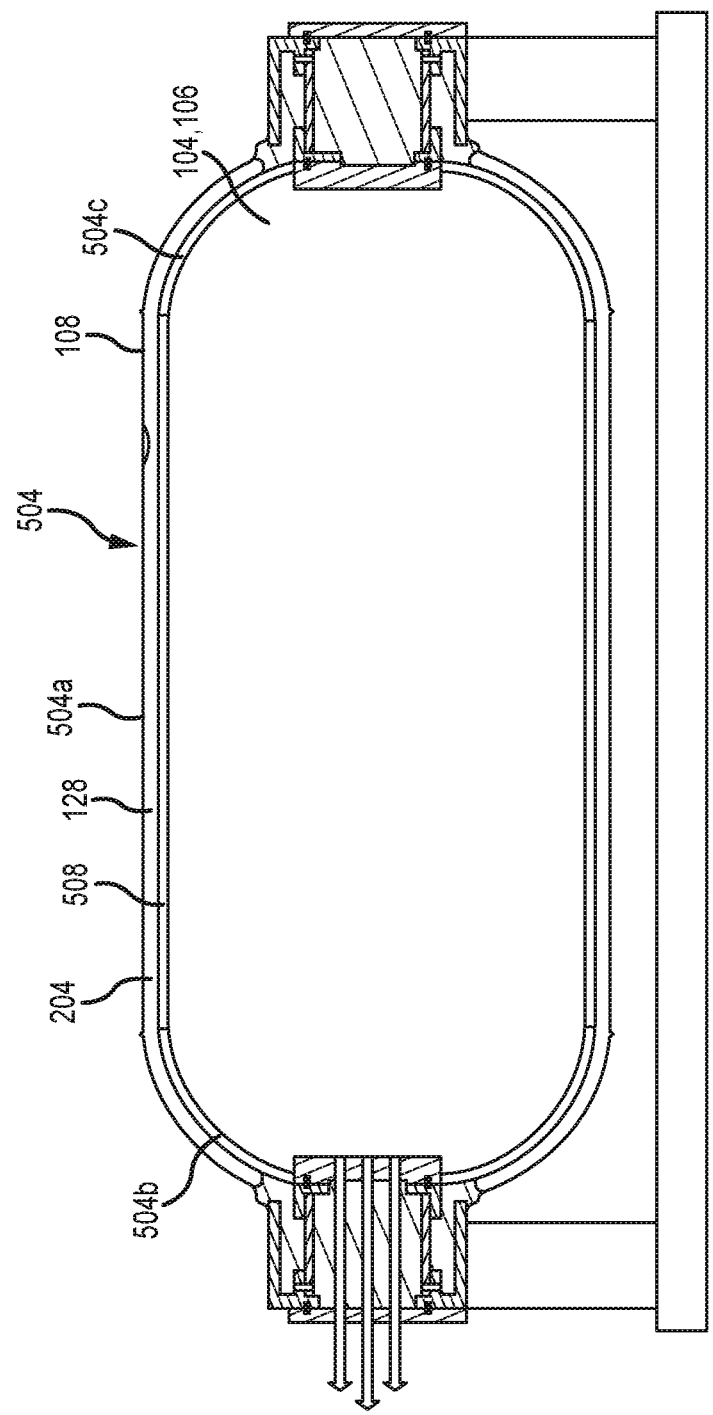
FIG. 6 is a cross-section of an integrated multi-layer insulation structure in accordance with other embodiments of the present disclosure installed over a vessel.

FIG. 6 illustrates an example composite IMLI structure 504 in accordance with other embodiments of the present disclosure, installed over an object 104 comprising a pressure vessel 106, in cross-section. As can be appreciated by one of skill in the art after consideration of the present disclosure, the object 104 being insulated by the composite IMLI structure 504 is not limited to a pressure vessel 106. Other examples of objects 104 being insulated include, but are not limited to, an open tank, a solid object, an instrument, or a vehicle structure. As shown, the cellular insulation structure 508 can be placed directly on the object 104 being insulated, with the IMLI structure 108 on a side of the cellular insulation structure 508 opposite the side on or adjacent the object 104. The composite IMLI structure 504 can be provided in one or more sections. For example, the composite IMLI structure 504 can include a central panel that is wrapped around a center portion of the pressure vessel 106 to form an annular central structure 504a. In addition, first 504b and second 504c end pieces can be provided at opposite ends of the object, and connected to the central portion 504a, to substantially enclose the object 104 and complete the composite IMLI structure 504. In addition, the IMLI structure 108 defines one or more interior volumes 204, which each can be filled with a selected gas 128.

Figure 7:
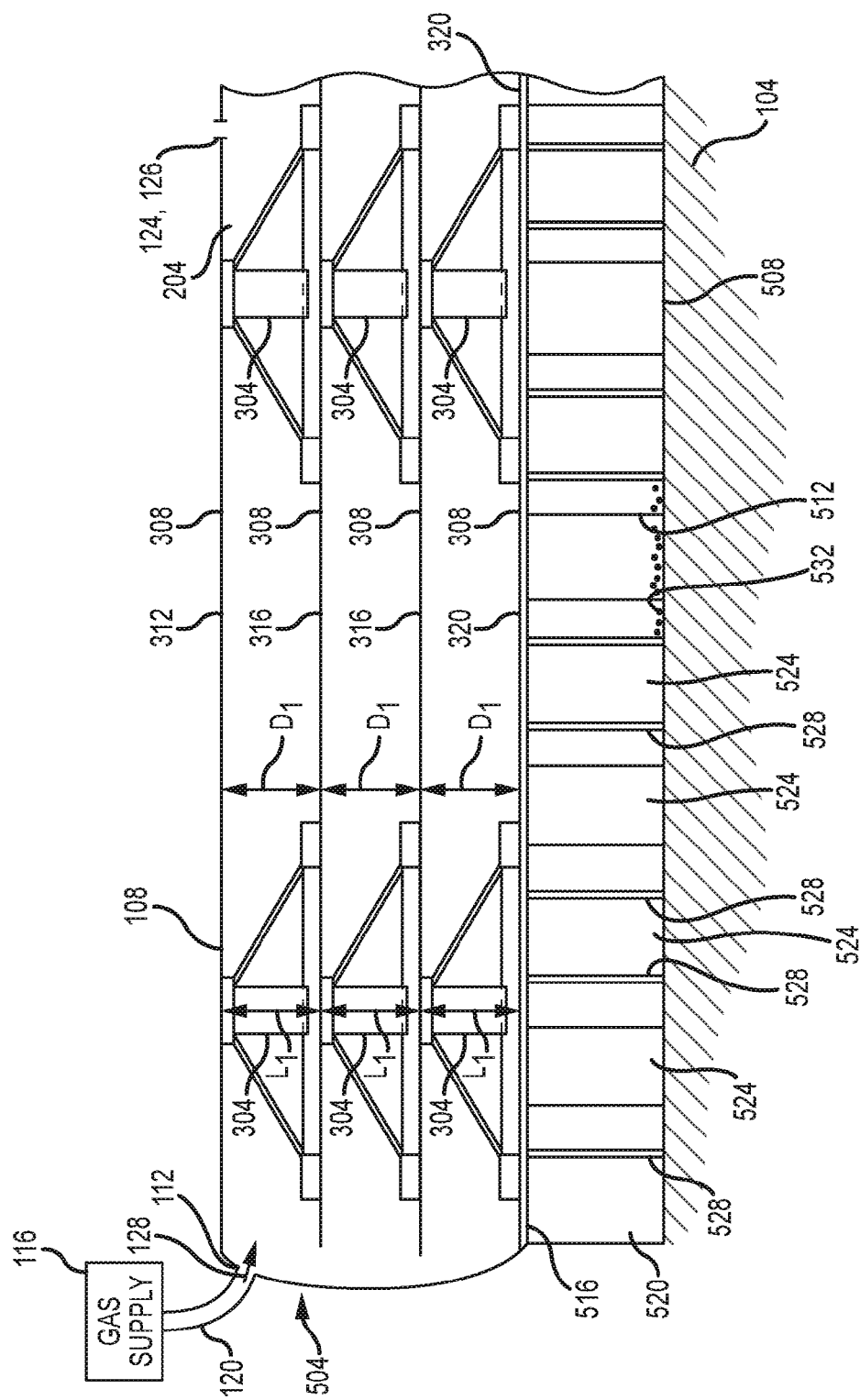
FIG. 7 is a partial cross-section of an integrated multilayer insulation structure in accordance with other embodiments of the present disclosure.

FIG. 7 is a partial cross-section of the composite IMLI structure 504. The composite IMLI structure 504 includes an IMLI structure 108 in combination with a cellular insulation structure 508. The IMLI structure 108 can be the same or similar to the IMLI structures described elsewhere herein. Accordingly, the IMLI structure 108 can include a plurality of sheets or layers of material 308, with adjacent sheets or layers of material 308 separated from one another by a plurality of post elements 304. The composite IMLI structure 508 differs from the embodiments of composite IMLI structures 508 shown in FIGS. 5 and 6 in that it includes one or more gas supplies 116 that are external to the IMLI structure 108.

More particularly, an interior volume 204 of the IMLI structure can be connected to a gas supply 116 via an inlet port 112 and a conduit 120. The IMLI structure 108 can also include an outlet 124 that selectively places the interior volume 204 in communication with an external environment. For example, in accordance with at least some embodiments of the present disclosure, gas 128 from the gas supply 116 can be admitted to the interior volume 204 through the inlet port 112, and can be vented from the interior volume 204 through the outlet port 124, where the outlet port 124 is configured to produce a back pressure that maintains the selected gas 128 at a selected pressure within the interior volume 204. This selected pressure may be maintained so long as the gas supply 116 remains connected to the inlet port 112, or until the gas supply 116 has run out of the supplied gas 128. In accordance with still other embodiments, an outlet port 124 can be associated with a valve 126 that opens under selected conditions. For example, a valve 126 may open when a pressure differential between the gas 128 within the interior volume 204 and a surrounding atmosphere becomes greater than a selected amount. A valve 126 associated with the outlet port 124 can be mechanically or electronically controlled. In accordance with still other embodiments, the outlet port 124 may be in the form of a simple aperture. Moreover, the inlet port 112 can function as an outlet after a conduit 120 connecting a gas supply 116 to the interior volume 204 has been disconnected, for instance where the gas supply 116 is configured as a T0 disconnect.

The cellular insulation structure 508 can include first 512 and second 516 layers or sheets of material placed on either side of a cellular layer or structure 520. The cellular structure 520 divides the volume between the first 512 and second 516 layers into a plurality of separate cells or chambers 524. The walls 528 defining the cells 524 extend between the first 512 and second 516 layers and can be arranged hexagonally when considered in plan view, to form a honeycomb configuration of closed cells 524. In accordance with at least some embodiments of the present disclosure, each of the cells 524 may contain a getter material 532. In addition, the cells 524 can be filled with a gas. As an example, a gas with favorable insulating properties, such as nitrogen, helium, carbon dioxide, or dry air can be used to fill the cells 524. Examples of a suitable getter material 532 include charcoal, carbon nanotubes, molecular sieves, or other materials that present a large surface area to promote the adsorption of vapor.

In accordance with still further embodiments of the present disclosure, the base layer 320 of the IMLI structure 108 can be adhered or bonded to the second layer 516 of the cellular insulation structure 508. In accordance with other embodiments, the base layer 320 of the IMLI structure 108 is also the second layer 516 of the cellular insulation structure 508. As shown, the first layer 512 of the cellular insulation structure 508 can be placed directly on an object 104 being insulated. In accordance with other embodiments, the cellular insulation structure 508 can be spaced apart from a surface of the object 104 being insulated.

Figure 8:
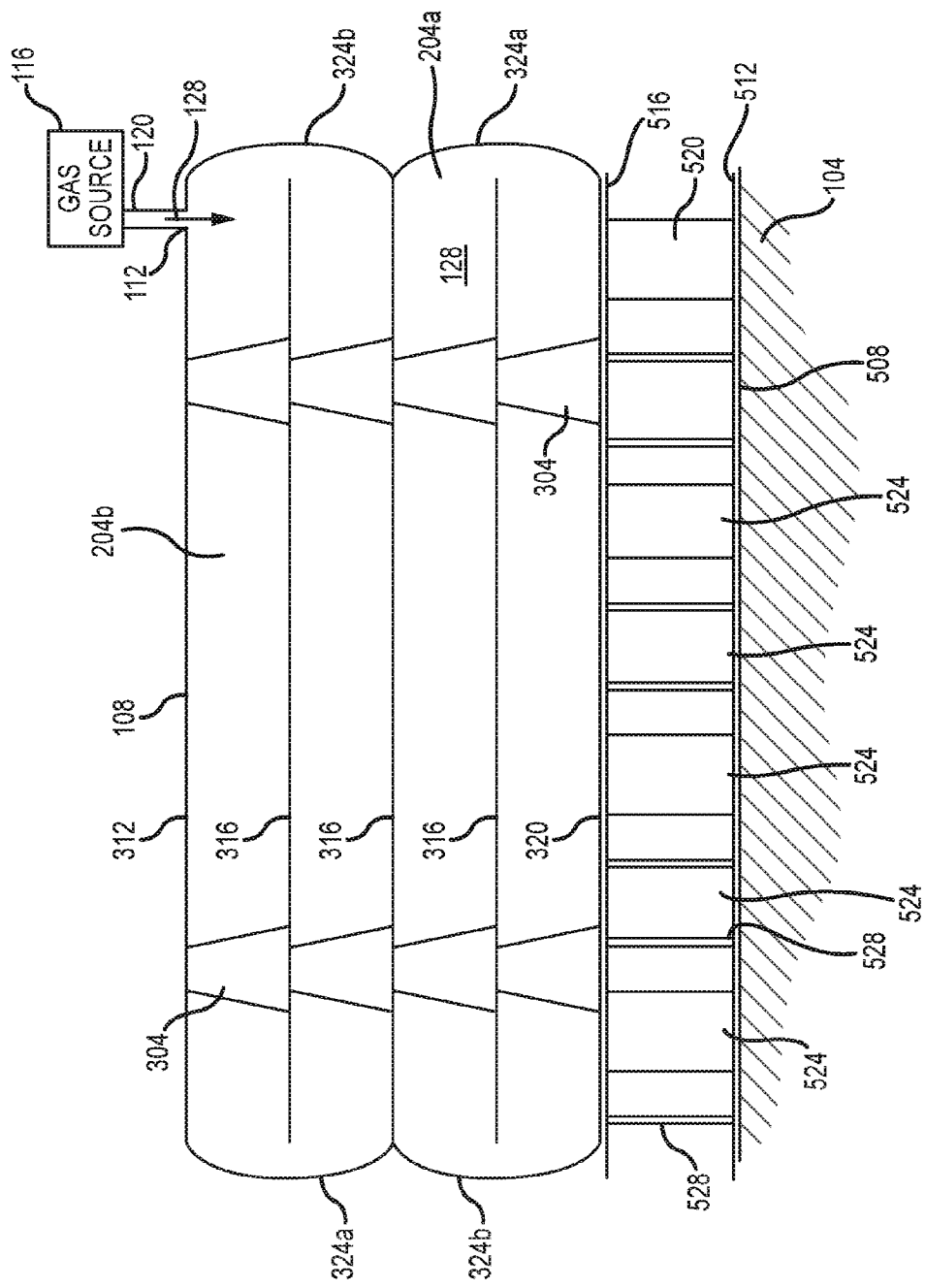
FIG. 8 is a partial cross-section of an integrated multilayer insulation structure in accordance with other embodiments of the present disclosure.

Yet another embodiment of a composite IMLI structure 504 in accordance with embodiments of the present disclosure is depicted in partial cross-section in FIG. 8. In this embodiment, a multiple chamber or interior volumes 204 IMLI structure 108 is combined with a cellular insulation structure 508. Accordingly, multiple interior volumes 204 are formed in connection with a plurality of side members 324a-b. In this way, the IMLI structure 108 of the embodiment of a composite IMLI structure 504 in FIG. 8 is similar to the IMLI structure 108 of FIG. 4. One difference however, is that the post elements 304 are static, and thus have a fixed length. Another difference is that the first interior volume 204a of the present embodiment is not associated with a gas source external to that interior volume 204a. Accordingly, the first volume 204a can be considered a sealed volume. The sealed volume can be filled with a selected gas 128. As shown in this example, the second interior volume 204b is associated with a gas source 116 that is associated with an inlet 112 configured as a T0 disconnect. More particularly, the gas supply 116 is configured to be disconnected from the IMLI structure 108 when the object 104 being insulated is launched or otherwise moved.

Figure 9:
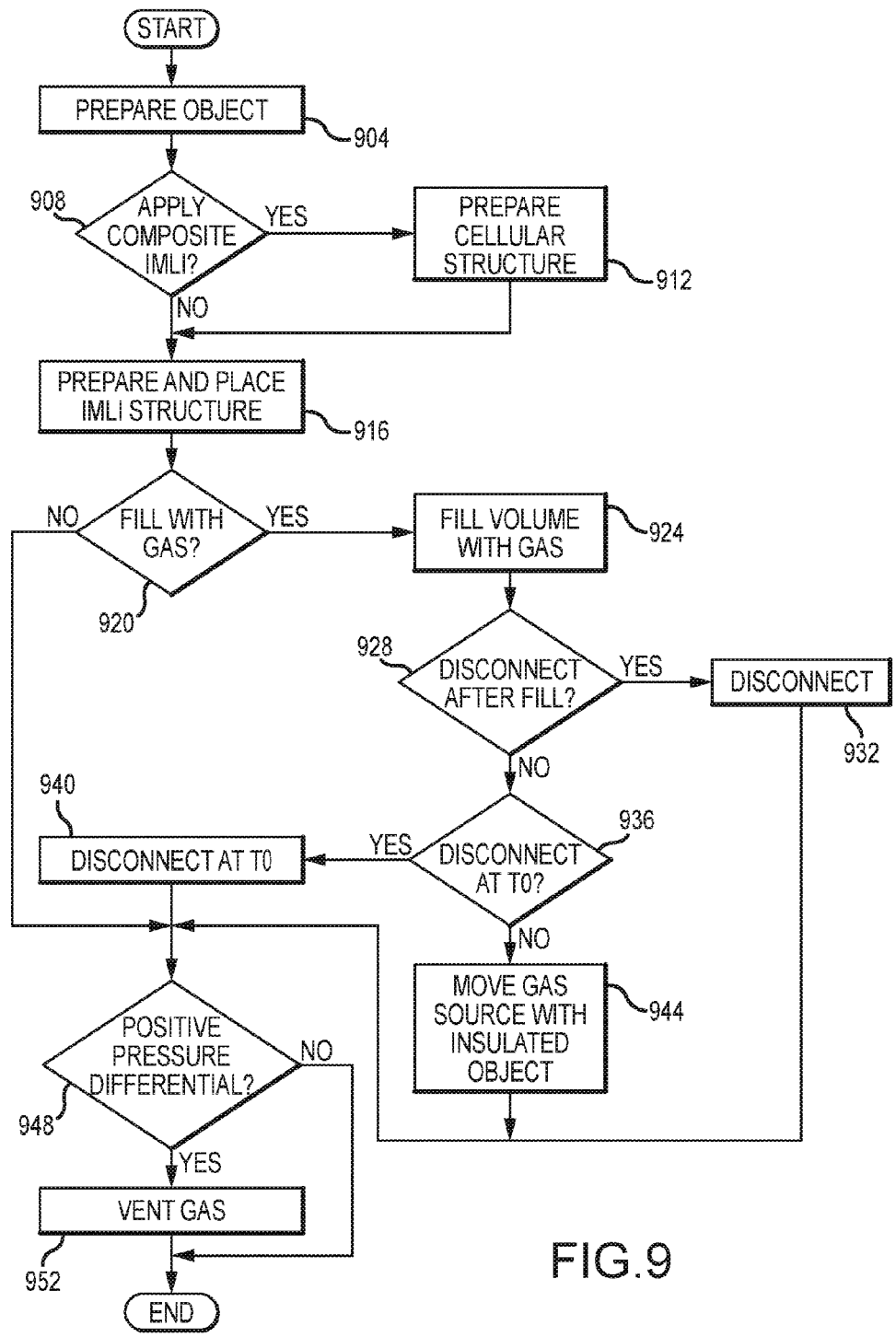
FIG. 9 is a flowchart depicting aspects of a method for insulating an object in accordance with embodiments of the present disclosure.

FIG. 9 is a flowchart depicting aspects of a process for insulating an object 104 in accordance with embodiments of the present disclosure. Initially, at step 904, the object 104 is prepared to receive insulation. This can include completing filling of an object 104 comprising a pressure vessel 106, or performing other steps that must or are conveniently taken before an insulating structure is applied to or around an exterior of the object 104.

At step 908, a determination is made as to whether a composite IMLI structure 508 is to be applied to the object 104. If a composite IMLI structure 108 is desired, a cellular insulation structure 508 is prepared (step 912). As can be appreciated by one of skill in the art after consideration of the present disclosure, preparation of the cellular insulation structure 508 can include adhering a cellular layer or insert 520 to a first layer of material 512, and then adhering a second sheet of material 516 to the opposite side of the cellular layer 520, sealing the cells 524 defined by the walls 528 of the cellular layer 520 between the first 512 and second 516 layers. Moreover, the process of sealing the cellular insulation structure 508 can be performed in an environment that is rich in a gas that is desirably held within the individual cells 524 of the cellular insulation structure 508. In accordance with still other embodiments, assembly can include coating a surface of either or both of the first 512 and second 516 layers, and/or the walls 528 of the cells 524, with a getter material.

At step 916, an IMLI structure 108 is prepared and is placed. As can be appreciated by one of skill in the art after consideration of the present disclosure, preparing an IMLI structure 108 can include adhering a set of posts or separating structures 304 to a surface of a first sheet or layer 308, adhering a second sheet or layer 308 to an opposite side of the post 304, and so on, until a selected number of layers 308 are provided. If no cellular insulation structure 508 is used, the IMLI structure 108 is placed on the exterior of the object 104. If a cellular insulation structure 508 is used, the cellular insulation structure is placed on the exterior of the object 104. Moreover, when a cellular insulation structure is used, the IMLI structure 108 can be joined to the cellular insulation structure 508, and the resulting composite IMLI structure 504 is then placed on the object, with the cellular insulation structure 508 portion of the composite IMLI structure 504 adjacent to the object 104.

At step 920, a determination is made as to whether one or more interior volumes 204 of the IMLI structure 104 are to be filled with a gas 128. If an interior volume 204 is to be filled with a gas, a gas source 116 is connected to the IMLI structure 108, and gas 128 from the gas source 116 is released into the interior volume 204 (step 924). At step 928, a determination is made as to whether the gas source is to remain connected to an associated interior volume 204 until or after the object 104 is launched or is otherwise moved. If a gas source 116 is not to remain connected to the interior volume 204 it is disconnected (step 932). Where multiple gas sources 116 are connected to one or more chambers 204, some or all of the gas sources 116 can be disconnected in this step.

At step 936, a determination is made as to whether the gas sources is to be disconnected when the vehicle is launched or moved, i.e., at time T0. If so, the gas source 116 is disconnected at the time of launch or initial movement of the object 104 (step 940). If a gas source 116 is connected that is not associated with a T0 disconnect, that gas source 116 can travel with the object 104 (step 944).

At step 948, the process can branch depending on whether there is a pressure differential between the interior chamber or chambers 204 of the IMLI structure 108 and the surrounding environment. If the pressure of the interior volume 204 is greater than the ambient environment, gas 128 can be vented or otherwise released from the affected volume or volumes 204, through an outlet port 124, an inlet port 112 functioning as an outlet port, for example after a T0 disconnect has occurred, or both (step 952). Venting can include operation of a mechanical valve 126 in response to the pressure differential, the opening of an electronically controlled valve in response to a control signal, or the simple venting of gas 128 from the volume 204 through a port 112 or 124 comprising an aperture as a result of the pressure differential. The process may then end.

Although various exemplary configurations have been described with particularity, other configurations and variations in accordance with the present disclosure are possible. For example, any number or layers or configurations of layer materials can be used. As another example, various features of IMLI structures 108 and composite IMLI structures 504 described herein can be used in any combination. For instance, an IMLI structure 108 can include all load responsive, all static, or both static and load responsive post elements 304. Moreover, one or more interior volumes 204 can be provided that are filled with the same or different gasses 128. In addition, gas supplies 116 that are disconnected prior to installation of the IMLI structure 108, after launch of a vehicle carrying an object 104 being insulated, or that remain connected while the insulation structure 108 is in use, can be provided. Any number of inlet ports 112 and outlet ports 124 can be provided, and those ports 112 and 124 can be formed in a layer 304, a side member 324, or both. In addition, some or all of these ports 112 and 124 can be associated with valves 126. Where a valve 126 is electronically controlled, actuation electronics, including but not limited to a power supply, control logic, or the like can be included in or associated with the IMLI structure 108. Moreover, an IMLI structure 108 can be used alone or in combination with other IMLI structures 108, directly adjacent an object 104 being insulated, over a cellular insulation structure 508, or over some other structure intermediate to the IMLI structure 108 and the object 104. In addition, a composite IMLI structure 504 can be placed directly against an object 104 being insulated, or over some other structure intermediate to the composite IMLI structure 504 and the object 104. In addition, embodiments of the present disclosure are not limited to use on cryogenic vessels. For example, embodiments of the present disclosure can be applied anywhere a high performance thermal insulation is desirable or required.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. An insulating structure, comprising:
   a plurality of sheets of material;
   a plurality of posts, wherein adjacent sheets of material are separated from one another by at least some posts included in the plurality of posts;
   a base layer included in the plurality of sheets of material;
   an outer layer included in the plurality of sheets of material;
   a side structure, wherein the side structure extends between the base layer and the outer layer;
   an interior volume, wherein the interior volume is defined by at least the base layer and the outer layer, wherein at least a first set of posts included in the plurality of posts is located within the interior volume;
   a first gas source;
   a port, wherein the port is formed in at least one of the side structure, the base layer, and the outer layer, and wherein the first gas source is in communication with the interior volume through the port; and
   a cellular insulation structure, including first and second layers and a plurality of cells between the first and second layers, wherein the plurality of cells are defined by walls that extend between the first and second layers, and wherein the base layer is between the cellular insulation structure and the outer layer.

2. The insulating structure of claim 1, further comprising:
   an outlet, wherein the outlet is formed in at least one of the side structure, the base layer, and the outer layer, and wherein the outlet places the interior volume in communication with an external environment.

3. The insulating structure of claim 2, wherein the outlet includes a valve.

4. The insulating structure of claim 2, wherein the outlet provides a selected back pressure to a gas in the interior volume.

5. The insulating structure of claim 1, wherein the interior volume includes first and second interior volumes, wherein the first and second interior volumes are separate from one another.

6. The insulating structure of claim 5, wherein the first interior volume contains at least some of a first gas and the second interior volume contains at least some of a second gas.

7. The insulating structure of claim 6, wherein the first gas source contains at least some of the first gas and is in communication with the first interior volume through the first port, the insulating structure further comprising:
   a second port;
   a second gas source, wherein the second gas source contains at least some of the second gas and is in communication with the second interior volume through the second port.

8. The insulating structure of claim 6, wherein a composition of the first gas is different than a composition of the second gas.

9. The insulating structure of claim 8, wherein the first interior volume is adjacent to the base layer, wherein the first gas is helium, wherein the second interior volume is adjacent to the outer layer, and wherein the second gas is nitrogen.

10. The insulating structure of claim 8, wherein a freezing point of the first gas is higher than a freezing point of the second gas.

11. The insulating structure of claim 1, wherein the cells in the plurality of cells in the cellular insulation structure are sealed from the exterior environment and from the interior volume.

12. The insulating structure of claim 11, wherein at least some of the cells in the plurality of cells contain a getter material.

13. The insulating structure of claim 12, wherein the at least some of the cells containing a getter material also contain a gas.

14. The insulating structure of claim 13, wherein the gas in the at least some of the cells is at least one of nitrogen, helium, carbon dioxide, and dry air.

15. The insulating structure of claim 13, wherein the plurality of cells in the cellular insulating structure are arranged in a honeycomb configuration.

* * * * *